US006741975B1

(12) United States Patent
Nakisa et al.

(10) Patent No.: US 6,741,975 B1
(45) Date of Patent: May 25, 2004

(54) RULE BASED EXPERT SYSTEM FOR CONSUMER PREFERENCE

(75) Inventors: Ramin C. Nakisa, Little Chalfont (GB); Robin Mackay, London (GB)

(73) Assignee: NCR Corporation, Dayton, OH (US)

( * ) Notice: Subject to any disclaimer, the term of this patent is extended or adjusted under 35 U.S.C. 154(b) by 467 days.

(21) Appl. No.: 09/651,981

(22) Filed: Aug. 31, 2000

(30) Foreign Application Priority Data

Sep. 1, 1999 (GB) .............................................. 9920661

(51) Int. Cl.$^7$ .............................................. G06F 17/00
(52) U.S. Cl. .............................. 706/47; 706/48; 706/45
(58) Field of Search ................................ 706/47, 48, 45

(56) References Cited

U.S. PATENT DOCUMENTS

| | | | | |
|---|---|---|---|---|
| 4,967,368 | A | 10/1990 | Bolling et al. ................. | 706/52 |
| 5,481,647 | A | 1/1996 | Brody et al. ................... | 706/11 |
| 5,546,507 | A | 8/1996 | Staub .......................... | 706/60 |
| 5,701,400 | A | 12/1997 | Amado ......................... | 706/45 |
| 5,806,049 | A | 9/1998 | Petruzzi ....................... | 705/36 |
| 6,324,650 | B1 | 11/2001 | Ogilvie ........................ | 713/202 |
| 6,405,191 | B1 * | 6/2002 | Bhatt et al. ................... | 707/3 |
| 2003/0007621 | A1 * | 1/2003 | Graves et al. ............... | 379/219 |

FOREIGN PATENT DOCUMENTS

| | | |
|---|---|---|
| CA | 2217523 | 10/1997 |
| EP | 0529130 | 3/1993 |
| GB | 2160684 | 12/1985 |

OTHER PUBLICATIONS

"Patterns in plain English", URL: http://ncr.knowledgelba.com/Projects/579972638AM.html, from NCR's "Financial Services Knowledge Lab" Web site at URL: http://ncr-.knowledgelab.com/top.html.

"The Web adviser", URL: http://ncr.knowledgelab.com/Projects/22071998110946.html, from NCR's "Financial Services Knowledge Lab" Web site at URL:http://ncr-.knowledgelab.com/top.html.

Shen et al., A Modular Approach to Generating Fuzzy Rules with Reduced Attributes for the Monitoring of Complex Systems, May 2000, Division of Informatics, The University of Edinburgh, Informatics Research Report EDI–INF–RR–0122.

Chouchoulas, Incremental Feature Selection Based on Rough Set Theory, PhD Proposal, Centre for Intelligent Systems and their Applications, Division of Informatics, The University of Edinburgh, 2001.

\* cited by examiner

*Primary Examiner*—George B. Davis

(57) ABSTRACT

An expert system and a method of providing automated advice are described. The system is regularly updated by advice (or diagnosis, recommendation etc.) given by practitioners in the relevant field. The combination of the underlying facts and the consequent (human) advice is used to update a ruleset that is then used to provide automated advice. An example of financial advice is given. A database contains the details for the customers of a financial institution together with advice and recommendations given previously by the institution's human advisors. This database is used to derive a ruleset which is then applied to a subsequent customer's details in an automated manner, possibly at the user's own PC via the World Wide Web. Frequent updating using data from the human advisors' work means that the database (and hence the ruleset) are kept up to date. Consistent advice can thus be provided with minimum human interaction.

39 Claims, 4 Drawing Sheets

RULE BASED EXPERT SYSTEM FOR CONSUMER PREFERENCE

BACKGROUND OF THE INVENTION

The present invention relates to an expert system and to a method of providing automated advice.

The invention has particular, but not exclusive, application to the field of financial services.

Recently, the range of financial services products available to the consumer has begun to express a dichotomy. The introduction of new technologies, systems and practices, coupled with consumers' growing knowledge and confidence in the field of financial affairs have led to the development of "execution-only" sales. In such sales even complex financial products such as pensions and investment products—once thought of as requiring "face-to-face" consultation—are being sold on a commodity basis.

The public appetite for such products seems to be growing. Increasing affluence and a diminishing welfare state in many developed countries mean that people are considering private personal investments as desirable or even necessary. In addition, the pace of everyday life means that they have less time to spend planning and consulting advisors on these investments.

Newcomers to the field of financial services are providing execution-only financial products by a number of channels: using a traditional application form, by telephone contact and over the Internet, typically from a consumer's own personal computer (PC). All of these channels have a significantly lower cost to the provider and avoid the cost of the provision and training of a traditional network of human advisers. Consequently, such providers are able to offer a cheaper service and/or be more profitable than their more traditional competitors. Established companies in the field may be reluctant to enter the execution-only market for fear that their good name will be tarnished. Their market share is, therefore, likely to diminish.

Some consumers may be reluctant to conduct an "execution-only" transaction because of lack of confidence in their own ability in the relevant field. Equally they may be daunted by the prospect of a detailed, and possibly rather revealing, interview with a human expert. There is also the fear that the advice given must be paid for and there will be substantial hidden charges in whatever product or products are recommended. The customer thus needs to obtain the relevant assurance from a different source.

SUMMARY OF THE INVENTION

It is an object of the present invention to ameliorate the above disadvantages.

In a broad sense, a first aspect of the invention relates to an expert system comprising a knowledge base, means for deriving advice from that knowledge base and means for continually updating the knowledge base with advice given by human experts. The invention also resides in a method of providing an expert system comprising maintaining a knowledge base, deriving advice from that knowledge base and continually updating the knowledge base with advice given by human experts.

The term "advice" should be understood to comprise anything that may result from an expert consultation, for example a medical diagnosis or the results of a fault-finding procedure on a piece of engineering machinery.

Considering the financial advice scenario, by linking the expert system to the customer profiles and decisions made by a company's human financial advisers, the system is continually brought up-to-date without any need for particular and time-consuming action on the part of the operator of the system. Other benefits include the averaging of advice provided by the human experts and the transparency of the advice given. By providing continual, real data from a number of experts operating in the field, poor-quality advice given by a small number of the experts will not unduly influence the quality of advice given by the system. Consequently, an established company can provide services without human intervention and without compromising their reputation—they really can obtain the best of both Worlds.

The advice given will preferably, through its cosmetic appearance to the end-user/consumer, be associated with the company's brand rather than with a particular adviser. Consequently the company need not fear that an adviser will quit the company, taking clients with them.

The transparency of the system is extremely important should the quality of the advice given come into question. The rules applied in any particular case will be readily derivable from the system. This ensures that the company or institution which runs the system has the necessary information to counter any allegations that advice in any particular case was flawed.

It is preferred that the system further comprises means for deriving a plurality of rules in response to the knowledge base, wherein the means for deriving advice from the knowledge base comprises means for applying the plurality of rules derived from the knowledge base. This may also be expressed in method terms as deriving a plurality of rules in response to the knowledge base, and deriving advice from the knowledge base by applying the plurality of rules derived from the knowledge base. The rules suitably comprise fuzzy rules, whereby the means for deriving advice can be arranged to provide a plurality of advice together with a respective indication of suitability.

To enable explanation to lay persons not versed in machine code, it is preferred that the rules are expressed in a natural language. The system may further include means for publishing the rules used to derive the advice.

The means for deriving advice preferably comprises an agent and in any event the system is apt to be structured as a distributed system, which is preferred, although the system could be implemented as a stand-alone system.

To maintain a human face, the system preferably further comprises means for providing a user with a consultation with a human expert. Such consultation is preferably provided remotely.

Put more specifically, an aspect of the invention resides in a knowledge-based system adapted to provide a recommendation tailored to a consumer, comprising:

a knowledge base containing historical data;

rule extraction means for extracting a ruleset from the knowledge base;

a rules database for holding the ruleset;

codifying means for codifying the requirements of the consumer; and recommendation means for applying the ruleset to the codified consumer requirements and generating the recommendation accordingly; characterized by rule induction means for providing learning inputs to the knowledge base from a plurality of human experts as they advise and make real-life recommendations to actual or imaginary consumers, the learning inputs reflecting the recommendations made by the experts and the requirements of the consumers that they have advised; and update means for running the rule extraction means on the knowledge base to refresh the rules database by extracting an updated ruleset from the knowledge base for application by the recommendation means to the requirements of future consumers.

This aspect can also be expressed as a method of building a knowledge-based system adapted to provide a recommendation tailored to a consumer, the system operating by extracting rules from a knowledge base and applying the extracted rules to codified consumer requirements to generate the recommendation accordingly; wherein the method is characterized by providing learning inputs to the knowledge base from a plurality of human experts as they advise and make real-life recommendations to actual or imaginary consumers, the inputs reflecting the recommendations made by the experts and the requirements of the consumers that they have advised; and, after learning inputs have been provided to the knowledge base, extracting updated rules from the knowledge base for use in generating recommendations tailored to the requirements of future consumers.

The update means suitably operates periodically and the rule induction means provides learning inputs to the knowledge base at least as frequently as the update means operates to extract an updated ruleset from the knowledge base. It is preferred that the rule induction means operates continuously to provide learning inputs as they are made available by the plurality of human experts.

As the possible range of recommendations will change from time to time as some products are introduced and others phased out, the update means is preferably adapted to update the knowledge base with changing details of recommendations that can be made.

Fully to understand the consumer's requirements, the codifying means advantageously includes means for codifying the perceived needs of the consumer and means for codifying the circumstances of the consumer.

The rule induction means suitably generates fuzzy sets, and the recommendation means suitably applies fuzzy rules. The rule extraction means therefore preferably implements Lozowski's algorithm but that algorithm is preferably modified to reduce memory and processing requirements. For example, attribute vectors may be generated incrementally, keeping only the last attribute vector generated with no storage of attribute vectors. This effectively fuses the creation of attribute vectors with the evaluation of T-Norm sets.

In an elegant arrangement, the attribute vectors can be incremented by generating a first attribute vector that contains the first fuzzy set for each attribute, and generating the next attribute vector by selecting the next fuzzy set of the first attribute in the first attribute vector. If the first attribute contains no more fuzzy sets to select, this technique further involves selecting the next attribute that contains more fuzzy sets to select, selecting the next fuzzy set of the selected attribute, and selecting the first fuzzy set of each lesser attribute than the selected attribute.

In another modification, a maximum T-Norm value can be generated while T-Norms are being generated. The T-Norm and S-Norm generating steps of Lozowski's algorithm are thus effectively fused together.

A further modification involves pruning an attribute tree by eliminating attributes that play no part in rule-building. Pruning can be achieved by marking a fuzzy set that returns zero for a current dataset example, and omitting evaluation of any attribute vector that includes the marked fuzzy set. For example, pruning an attribute vector at class i can involve incrementing to the next fuzzy set value for the i-th digit of the vector while resetting any lesser digits to 0. If the i-th digit contains no more fuzzy sets, pruning involves incrementing the i+1-th digit.

Thus modified, Lozowski's algorithm can be applied generally to different aspects of the invention.

Another aspect of the invention resides in a knowledge-based system adapted to provide a recommendation tailored to a consumer, comprising:

a knowledge base containing historical data;

rule extraction means for extracting a ruleset from the knowledge base;

a rules database for holding the ruleset;

codifying means for codifying the requirements of the consumer; and recommendation means for applying the ruleset to the codified consumer requirements and generating the recommendation accordingly;

explanation means for explaining to the consumer the reason(s) for the recommendation, characterized in that the system uses XML (Extensible Markup Language) to define consumers and possible/actual recommendations.

This aspect may also be expressed as a method of operating a knowledge-based system to provide a recommendation tailored to a consumer, the system operating by extracting rules from a knowledge base and applying the extracted rules to codified consumer requirements to generate the recommendation accordingly and explaining to the consumer the reason(s) for the recommendation characterized in that XML (Extensible Markup Language) is used to define consumers and possible/actual recommendations.

The explanation means is suitably associated with the rule extraction means for locating the rules that govern decisions reached by the recommendation means in making the recommendation, and is configured to explain to the consumer the rules on which the recommendation was based. For the benefit of understanding by lay persons, the explanation means is preferably configured to express the explanation substantially in a natural language.

As before, the rule extraction means preferably runs Lozowski's algorithm, which may be modified as set out above.

The recommendation means is suitably configured to provide the recommendation as a document based on an XML DTD (document type definition).

The recommendation means may be configured to suggest a plurality of alternative recommendations, in which case it is preferred that recommendations are ranked by their suitability.

The systems and methods of the invention preferably involve storing a consumer's details for later recall. These details can be recalled later in providing a future recommendation, or in completing a recommendation where input of consumer requirements has been suspended temporarily.

Provision may be made for obtaining advice from a remote human adviser, for example over a video conference link between the consumer and the adviser.

The systems of the invention are preferably distributed. In the preferred embodiment to be described herein, a server holds the ruleset and data on consumers and on possible recommendations, a consumer terminal provides an online interface with the server, and a plurality of expert terminals are operable by the plurality of human experts. Each expert terminal including means for storing recommendations made by an expert and the requirements of consumers that that expert has advised, and means for providing that stored data to the server for use in updating the ruleset. The ruleset and data on consumers and on possible recommendations are preferably stored at the server as XML (Extensible Markup Language) documents.

The consumer terminal can take any suitable form, preferably being a home PC or a kiosk, booth, ATM or other terminal in a financial advice establishment.

The systems of the invention preferably include an application server enabling consumer terminals and expert terminals to interact with the server online, the application server providing an online interface to the server for the consumer terminals and the expert terminals. The application server can run server-side web applications, a first web application responding to calls from a consumer website, and a second web application allowing access to the server by authorized expert terminals. These server-side web applications are suitably Java Servlets.

The recommendation means of the invention may include an agent that applies the rules to the codified consumer requirements to generate the recommendation. To escape from a form-based interface that could swiftly discourage the consumer, the agent suitably asks a sequence of questions and includes means for adapting later questions in the sequence in accordance with answers given to earlier questions in the sequence. That way, the minimum of input is requested from the consumer and as much as possible is of relevance to the consumer.

BRIEF DESCRIPTION OF THE DRAWINGS

Other preferred features of the invention will be apparent from the attached claims and the following description.

The present invention will now be explained and described, by way of example, with reference to the accompanying drawings, in which.

DETAILED DESCRIPTION

Figure 1:
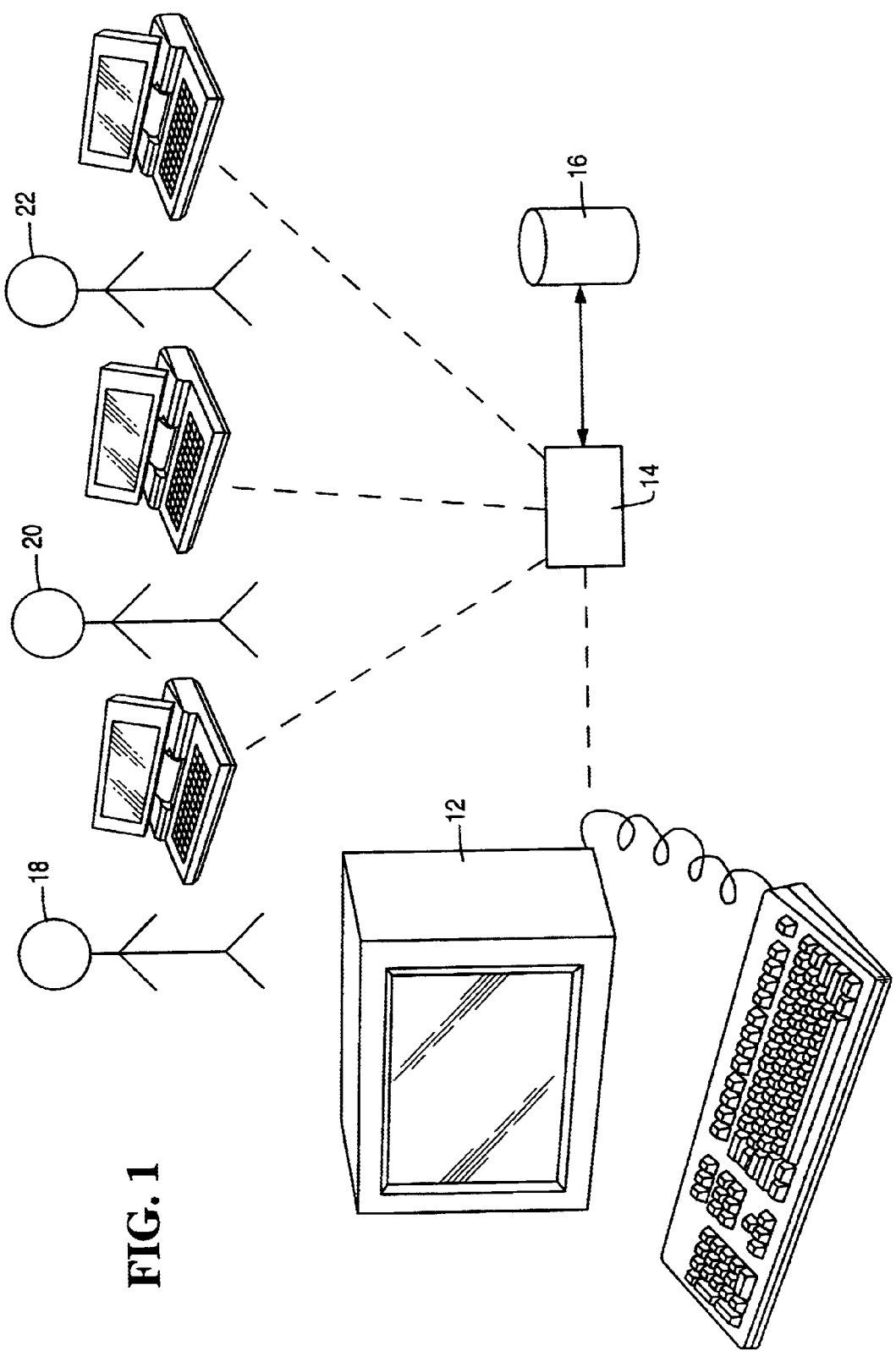
FIG. 1 shows a schematic diagram of a distributed system in accordance with an embodiment of the invention.

FIG. 1 shows a system 10 comprising a user's terminal 12 linked to a processor 14 which is coupled to a database 16, and a number of financial advisors 18, 20, 22 each having a portable Personal Computer (PC) linked (at least periodically) to the processor 14. As each financial advisor conducts a fact-find (generating an attribute list) for a customer and issues advice to that customer the relevant information is sent to the processor 14 for inclusion in the database 16. Periodically the processor updates a set of rules which are used to derive advice from the information provided by a user at the terminal 12. The frequency of rule up-dating will depend upon the quantity of the new information being provided and the volatility of the underlying issues upon which advice is being provided. A daily update would be suitable in the case of a company offering financial advice. More or less frequent updates could also be provided.

The user may interact with the system via a World Wide Web (WWW) browser. This has the advantage that the (computer-literate) user is operating in a known, and comfortable, environment. The ruleset and information relating to customer and product/services are stored at a Web server and an application server running Java (TM) Servlets allow the customer to interact on-line.

The system may operate in a generic sense that the inputs and outputs of the system can be customized externally for a particular institution, brand and so on. Using the language XML can provide this. XML is in increasingly common usage on the World Wide Web (WWW)—XML is a language for defining document types and semantically specifies the information they contain.

XML allows a programmer to abstractly describe a consumer profile, a financial product, and a recommendation, as data structures. The presentation of these data can be delegated to a separate processor/application. Therefore, the system as described can be utilized by many companies, each providing their own formatting instructions in stylesheets so that the visual experience of the end-user will be managed in keeping with the company's public image and branding requirements. Furthermore, these formatting instructions can contain pointers or Universal Resource Indicators (URIs) which will link or replace, in an XML recommendation document, a certain type of financial product, with a specific example of that product, provided by the company concerned.

Figure 2:
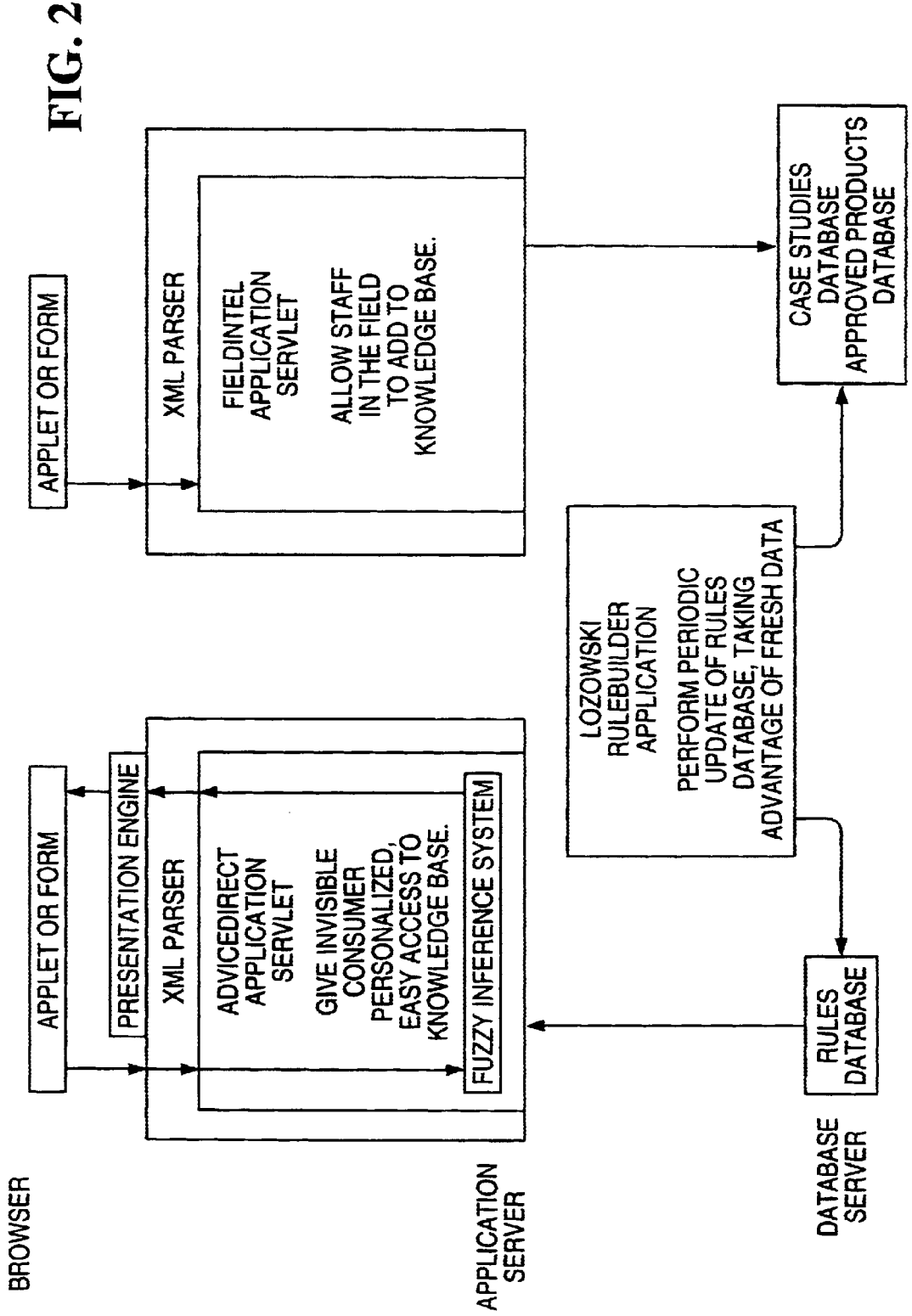
FIG. 2 shows a more detailed block diagram of the system shown in FIG. 1.

The user's terminal may be replaced by a kiosk in a bank, a terminal in a bank for use by bank staff (so that untrained personnel can give advice, and that advice will be consistent for a given company, throughout their branch network) or even an Automatic Teller Machine (ATM). Other techniques may be used for inputting the information from the advisors FIG. 2 shows a block diagram of the two arms of the system shown in FIG. 1. These can broadly be thought of as the input and output arms. On the left is the output arm which comprises a browser, application server and a database server. At the application server an Advice Direct Application Servlet or other server-side web application (e.g. Active Server Pages (ASP)) gives the consumer personalized but easy access to the knowledge base. Via a presentation engine (this is where the XML/stylesheet merging happens), this provides an applet or form to the user who inputs the answers to the relevant questions. The information provided is parsed and provided to a fuzzy inference system. This inference system obtains the rules from a rules database stored at the database server. The inference system uses the rules to classify the set of attributes the user has input. Then, through the presentation engine, a recommendation is provided to the user.

On the input arm of the system an applet or form is completed by the experts "in the field" and the information is parsed. A Field Intelligence Application Servlet or other server-side application allows staff to add to the knowledge base. This includes, for each case, the attributes of a consumer and the recommendation given to that consumer by the human experts. A recommendation is defined at this level as a value for each of a number of classifications (i.e. true or false for "recommend Individual Savings Account (ISA)). Finally, a rule builder application, for example a rule inference system based upon Lozowski's algorithm (see below) is activated periodically to update the rules database on the basis of the cases input to the knowledge base.

Figure 3:
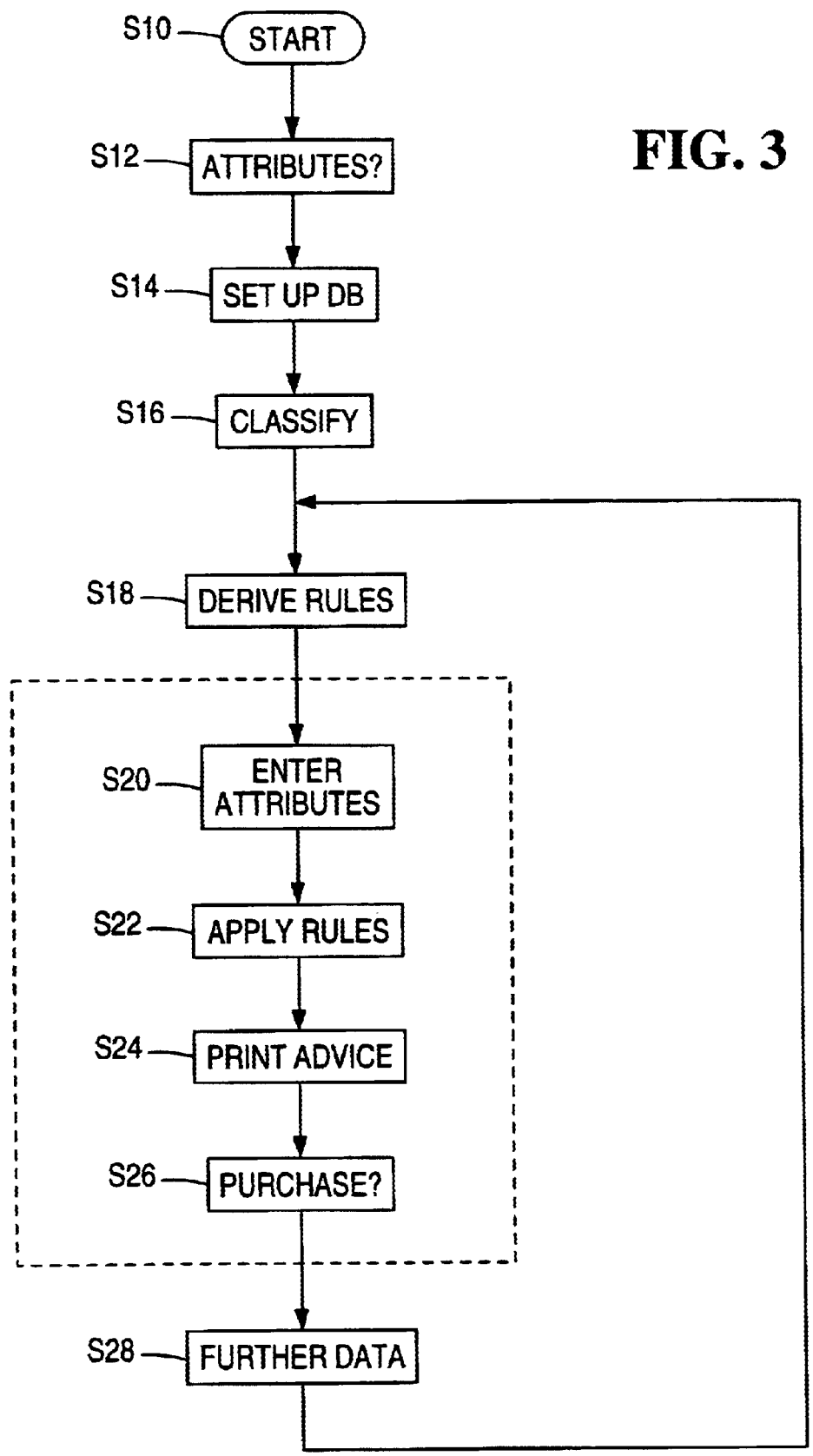
FIG. 3 shows a flow chart of the steps in accordance with an embodiment of the invention.

In FIG. 3 after starting at step S10, the method proceeds to derive a list of required attributes for advising in the field in question. This will entail talking to an expert, or preferably, a number of experts to determine which are the primary indicators. It is important here to remember that the user has limited time and all effort must be made to reduce, and preferably eliminate, any superfluous inquiries. In the financial advice scenario, a number of financial advisors will be asked what are the crucial attributes such as income, age, marital status, existing financial commitments, attitude to risk and so on. These attributes may be defined for the purpose of the system as possible values on a linear or binary scale, but it is preferred that, in conference with an expert, they are defined as possible values within a fuzzy set. Further information on fuzzy sets can be found in "The Fuzzy Systems Handbook: A Practitioner's Guide to Building, Using and Maintaining Fuzzy Systems." by Earl Cox and published by Academic Press, Inc., 1994. ISBN 0-121-94270-8. When a consensus has been reached on which attributes to include, the process proceeds to step S14.

At this stage a fundamental database is set up. This can be populated with a real or imaginary dataset. In the case of financial advice, this can be derived from existing customers of a bank or other institution offering financial services. Alternatively, imaginary sets of attributes may be derived with the intention of providing the best imaginable spread of attribute combinations. The size of the database depends upon the variety of the data set and the number of consequent options. Generally speaking, the larger the database, the better the advice. In the case of financial advice, it is anticipated that tens of thousands of cases will provide a sufficiently robust system for commercial use.

At step S16, the expert or experts are again consulted and the profile of each consumer and the corresponding classifications are stored. It is possible for more than one adviser to give advice on each case (set of attributes). The Lozowski rule induction system discussed below can readily cope with this. If two or more advisers gave the same recommendation then this would reinforce the relevant (fuzzy) rule.

At step S18 a set of rules are derived from the combination of the consumer profiles and their classifications. This is preferably performed to formulate a number of fuzzy rules and a preferred technique is given in Shien, Q & Chouchoulas, A (1996)"Generating Fuzzy Classification Rules from Crisp Examples" NCR Knowledge Lab-sponsored PhD, Dept. of Artificial Intelligence, University of Edinburgh. January 1998. This builds on work described in "Crisp Rule Extraction From Perceptron Network Classifiers" by Lozowski, Cholewo and Zurada and published in Proceedings of International Conference on Neural Networks, volume of plenary, panel and Special Sessions, pp. 94–99, Washington D.C., 1996.

Briefly, such rule extraction techniques take a set of pre-classified training examples in the form of vectors of attributes and the classes to which they belong and extract a set of fuzzy rules to accurately partition the input space to fit the classifications. In the case of financial advice, the vectors comprise the list of attributes for each customer during the training phase (be they real or imaginary customers) and the classes comprise those people who have common sets of advice. For example, everybody whose set of attributes led the experts to recommend a particular product or combinations of products are classed together. Clearly, the larger the number of people in the database the greater the accuracy of the rules. The rules generated by this technique are fuzzy and are associated with a degree of certainty (which depends upon the strength of support for them provided by the original data set). A "tolerance" parameter (which is adjustable) determines the strength required of particular rules. If this parameter equals 0.7 (e=0.7) the system will only use rules which are 70% certain or more.

One major advantage of the rule-extraction technique discussed above is that it is purely mathematical and can thus be transparent to a user. In contrast a system based on a neural network (which also learns continually) would not be transparent. This may have an important impact on consumer appeal, on acceptability to financial services companies, and on whether the system will receive regulatory approval from the relevant bodies in various countries.

At step S20 an end-user of the system is invited to enter the relevant attributes and a number of input techniques will be suitable. This may be sold to the end-user in the form of an agent that goes on to conduct steps S20 and S22 of the process. The relevant software, however may be provided free by a company whose products are recommended by the software. One advantage of using the invention over the traditional human advisor is that the process can be interrupted as the user desires. In a preferred embodiment the input is stored for some time to come so that a user subsequently only has to update his set of attributes when using the system subsequently.

Once the attribute set is complete (including desires and so-called "soft" factors such as the user's attitude to risk) processing proceeds to step S22 at which the fuzzy rules are applied to the new set of attributes. There are a number of options available at this point. The advice that best matches the attributes could simply be shown to the customer or printed out and an option to purchase given to the user. However, since fuzzy rules give a series of graded outputs it is possible to provide all of the possible pieces of advice ranked in order of suitability (strength of recommendation). The choice between the two can be made by the system designer or by the end user. Once the advice has been given, the user can be given the option to purchase, or be provided with further information about, any of the products that have been advised.

The rules which were used to provide the advice may also be printed at the request of the user.

If, at any time, the user feels uncomfortable or out of his depth he may request that he obtains a consultation with a human financial advisor. The use of the automated system would not be a waste of time because a lot of the information required by the human advisor would already be available to him. The interview could be conducted in the traditional manner or via a proprietary Web browser video conference link. The provider may, of course, charge for this service, for example on a time basis.

The advisor may be arranged not to promote any one company's products but may give advice in a generic sense, for example, "You should buy a stock-market based pension". Alternatively, the adviser may be arranged to provide recommendations in a generic sense to further software which then provides the user with details of the relevant product or products from the institution/provider operating the system.

In order to keep the advice generated by the system up to date, it is possible to build obsolescence as a parameter for the rule builder applications. Consequently, advice given a long time ago is not then used to generate rules.

At step S28 the data from a number of relevant human experts is entered in to the database and, periodically, the rule set is updated by the return of processing to step S18. Clearly the steps S20, S22, S24 and S26 may be conducted by a different system to that of steps S18 and S28.

The system may divide the relevant field so as to save the user time. For example, the financial field may be divided into three categories:

1 Savings and investments
2 Life protection
3 Retirement planning

Since different (although possibly overlapping) information will be required from the user in each of these situations the user may select the field or fields in which he is interested to save time.

Figure 4:
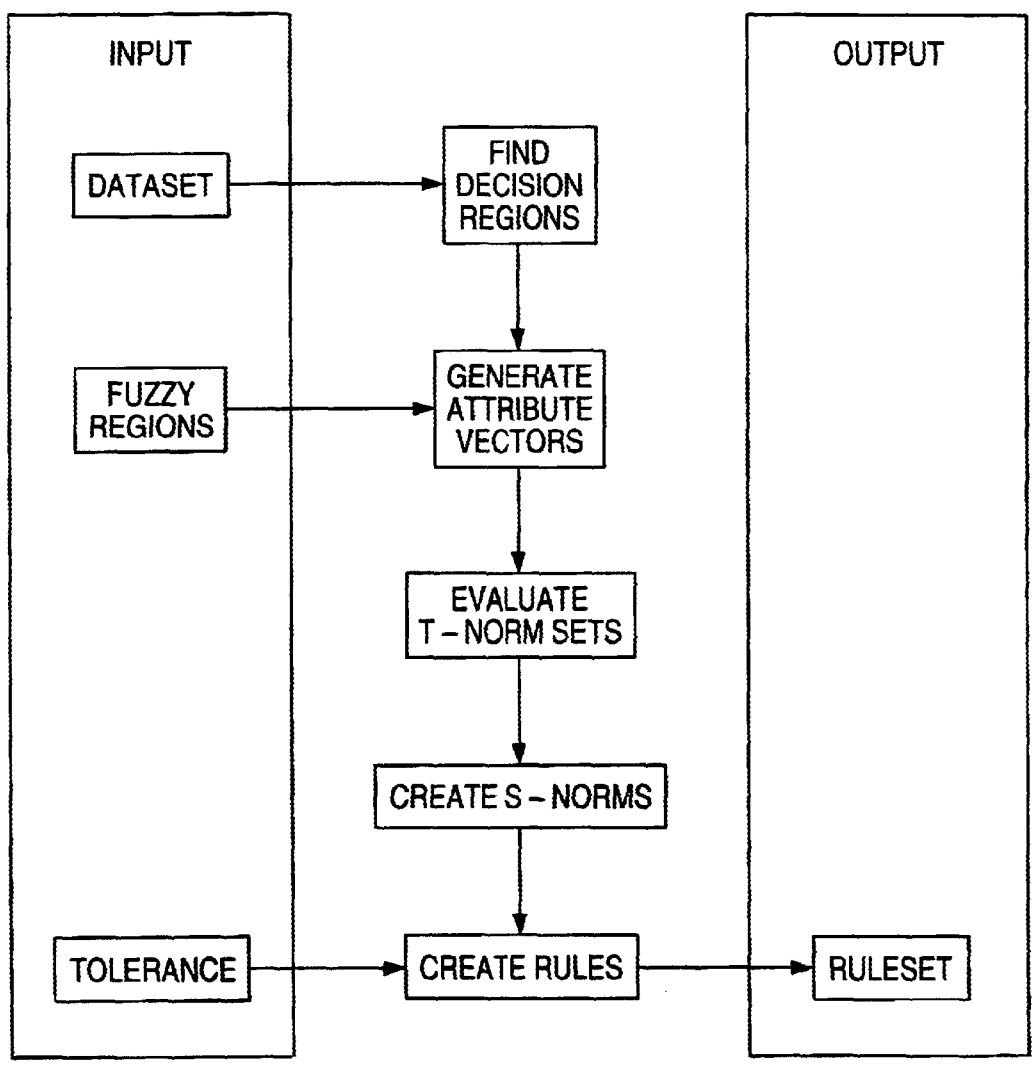
FIG. 4 shows a flow chart of a rule building algorithm for use with an embodiment of the invention.

FIG. 4 shows the known set of steps used in the derivation of the rules using the Lozowski rule builder algorithm. Further details can be found in the references identified earlier. What follows is a description of certain modifications that have been applied to the described system for the embodiment described above. The Lozowski technique derives linguistically expressed rules from real-valued examples. The technique was originally proposed to be used in conjunction with neural network-based classifiers but it may be used with other classifiers. Indeed, in the financial advice scenario described, it is preferred that a non-neural network technique is used so that the rules applied are transparent. While the technique is generally fast the number of attributes should be kept to a minimum in order not to unnecessarily impair the operation speed. Too few attributes will, however, degrade the results obtained. Of particular benefit to many applications, particularly the financial advice application, is the graceful manner in which the technique deals with missing data.

The first modification to the technique concerns the generation of the attribute vectors. While this is not particularly time consuming it is extremely demanding of memory. The step that required the creation of all of the attribute vectors has been omitted (in its own right) and has been fused with the evaluation of the T-Norm sets. Instead of producing large amounts of attribute vectors (i.e. combinations of fuzzy set membership functions for each attribute) attribute vectors are generated incrementally by keeping only the last one generated The consequence is that the step is combined with the T-Norm generation step—because there is no storage of all of the attribute vectors they must be generated at the point of consumption.

The modified technique starts off with an attribute vector that contains the first fuzzy set for each attribute. To produce the next combination we "increase" the fuzzy set of the first attribute (i.e. select the next one for the first attribute). If there are no more fuzzy sets, the first one is again selected (it "wraps around") but we increase the next one. If the next one was the last one for the next attribute as well, we wrap that one to zero and increase the next one. This process resembles the operation of a mechanical tape deck counter, although there are fuzzy membership functions instead of digits and each digit may have a different number of membership functions from the others.

In mathematical terms, what this part of the algorithm is doing is a simple process of counting. However, the number of the count has potentially different bases for each of its digits (as each attribute-digit may have an arbitrary number of fuzzy sets).

A similar principle is also applied to the T-Norm sets. Processing power and memory are conserved by not storing the T-Norm sets temporarily. Instead of storing the T-Norm sets, locating the maximum value and storing it as an S-Norm, we calculate the maximum T-Norm value while the T-Norms are being generated. T-Norm sets are consequently not generated at all. The T-Norm and S-Norm generating steps are thus also fused together.

The final significant departure from the published technique is pruning of the attribute tree. This is based on the observation that when membership of a fuzzy set is zero, the respective T-Norm will evaluate to zero (because the minimum membership is kept). Because any other T-Norm will be greater than or equal to this one, a zero T-Norm plays no role in rule induction.

As described above, the attribute vector can be seen as a counter whose digits are each of a different base. For example, if we have a four-attribute dataset, where attributes are split into five, four, three and four fuzzy sets respectively, the first attribute vector would be 0000 and the last one would be 3234 (the first attribute corresponds with the rightmost digit). Going through the attribute vector combinations is equivalent to counting (where each digit indexes one fuzzy set, starting with fuzzy set 0). Consequently, we would get 0000, 0001, 0002, 0003, 0004, 0010, 0011 and so on up to 3234.

The combinations of all fuzzy sets for all attributes may be seen as a decision tree with depth equal to the number of attributes in the dataset. This tree can be pruned to eliminate those that play no part in rule-building. Pruning consists of marking a fuzzy set that returned zero for the current dataset example as useless. Any attribute vector that includes this fuzzy set will be of no use to the algorithm so its evaluation can be omitted. We also stop evaluating sub trees at this point. Pruning at class i involves jumping to the next value for the i-th digit while resetting any lesser digits to 0. So, pruning an attribute vector encoded as 1021 at the third digit (from the right) will result in a new attribute vector 1100. The second and first digits are reset to 0 and the third digit increases. If the i-th digit wraps around, the next digit increases to take up the addition carry. So, 1222 becomes 2000. Pruning greatly reduces the amount of processing required for each dataset line.

While the present invention has been described in the contact of personal financial advice, it should be borne in mind that it is equally applicable to expert systems in other fields, such as medical advice, automobile fault-finding and so on.

What is claimed is:

1. A knowledge-based system for providing a recommendation tailored to a consumer, the system comprising:
   a knowledge base containing historical data;
   rule extraction means for extracting a ruleset from the knowledge base;
   a rules database for holding the ruleset;
   codifying means for codifying the requirements of the consumer; and
   recommendation means for applying the ruleset to the codified consumer requirements and generating the recommendation accordingly;
   explanation means for explaining to the consumer at least one reason for the recommendation; and
   means for using XML (Extensible Markup Language) to define consumers and possible/actual recommendations.

2. A system according to claim 1, wherein the recommendation means is configured to provide the recommendation as a document based on an XML DTD (document type definition).

3. A system according to claim 1, wherein the explanation means is associated with the rule extraction means for locating the rules that govern decisions reached by the recommendation means in making the recommendation, and is configured to explain to the consumer the rules on which the recommendation was based.

4. A system according to claim 1, wherein the explanation means is configured to express the explanation substantially in a natural language.

5. A system according to claim 1, wherein the rule extraction means runs Lozowski's algorithm.

6. A system according to claim 1, wherein the recommendation means is configured to suggest a plurality of alternative recommendations.

7. A system according to claim 6, wherein the recommendation means is configured to rank recommendations by their suitability.

8. A system according to claim 1, wherein the codifying means includes means for codifying the perceived needs of the consumer and means for codifying the circumstances of the consumer.

9. A system according to claim 1, further comprising storage means for storing a consumer's details for later recall.

10. A system according to claim 9, wherein the storage means stores the consumer's details for later recall in providing a future recommendation.

11. A system according to claim 10, wherein the storage means stores the consumer's details for later recall in completing a recommendation, and is associated with means for suspending input of consumer requirements.

12. A system according to claim 1, further comprising communications means for obtaining advice from a remote human adviser.

13. A system according to claim 12, wherein the communications means comprises a video conference link between the consumer and the adviser.

14. A system according to claim 1, wherein the system comprises a distributed system.

15. A system according to claim 14, further comprising a server holding the ruleset and data on consumers and on possible recommendations, a consumer terminal providing an online interface with the server, and a plurality of expert terminals operable by the plurality of human experts, each expert terminal including means for storing recommendations made by an expert and the requirements of consumers that that expert has advised, and means for providing that stored data to the server for use in updating the ruleset.

16. A system according to claim 15, wherein the consumer terminal includes a home PC or a kiosk, booth, ATM or other terminal in a financial advice establishment.

17. A system according to claim 16, further comprising an application server enabling consumer terminals and expert terminals to interact with the server online, the application server providing an online interface to the server for the consumer terminals and the expert terminals.

18. A system according to claim 17, wherein the application server runs server-side web applications, a first web application responding to calls from a consumer website, and a second web application allowing access to the server by authorized expert terminals.

19. A system according to claim 18, wherein the server-side web applications include Java Servlets.

20. A system according to claim 1, wherein the ruleset and data on consumers and on possible recommendations are stored at the server as XML (Extensible Markup Language) documents.

21. A system according to claim 1, wherein the recommendation means includes an agent that applies the rules to the codified consumer requirements to generate the recommendation.

22. A system according to claim 21, wherein the agent includes questioning means for obtaining the consumer's requirements, the questioning means asking a sequence of questions and including means for adapting later questions in the sequence in accordance with answers given to earlier questions in the sequence.

23. A system according to claim 1, further comprising means for updating the knowledge base with changing details of recommendations that can be made.

24. A method of operating a knowledge-based system to provide a recommendation tailored to a consumer, the method comprising:

extracting rules from a knowledge base; and applying the extracted rules to codified consumer requirements to generate the recommendation accordingly and explaining to the consumer at least one reason for the recommendation, wherein XML (Extensible Markup Language) is used to define consumers and possible/actual recommendations.

25. A method according to claim 24, wherein the recommendation is provided to the consumer as a document based on an XML DTD (document type definition).

26. A method according to claim 24, further comprising:

explaining to the consumer the rules on which the recommendation was based.

27. A method according to claim 24, further comprising:

expressing the explanation substantially in a natural language.

28. A method according to claim 24, wherein Lozowski's algorithm is applied to extract rules from the knowledge base.

29. A method according to claim 24, further comprising suggesting a plurality of alternative recommendations.

30. A method according to claim 29, further comprising ranking recommendations by their suitability.

31. A method according to claim 24, further comprising updating the knowledge base with changing details of recommendations that can be made.

32. A method according to claim 24, wherein the codified consumer requirements include the perceived needs of the consumer and the circumstances of the consumer.

33. A method according to claim 24, further comprising storing a consumer's details for later recall.

34. A method according to claim 33, wherein the consumer's details are stored and later recalled when providing a future recommendation.

35. A method according to claim 33, wherein the consumer's details are stored and later recalled when completing a recommendation, input of consumer requirements being suspended in the meantime.

36. A method according to claim 24, wherein the consumer obtains advice from a remote human adviser.

37. A method according to claim 36, wherein the advice is obtained over a video conference link.

38. A method according to claim 37, wherein the consumer enters consumer requirements via a consumer terminal being a home PC or a kiosk, booth, ATM or other terminal in a financial advice establishment.

39. A method according to claim 38, wherein the consumer enters consumer requirements in response to a sequence of questions, and wherein later questions in the sequence are adapted in accordance with answers given to earlier questions in the sequence.

* * * * *